United States Patent [19]

Seger et al.

[11] 3,951,165
[45] Apr. 20, 1976

[54] IRRIGATION SYSTEM PIVOT SWIVEL

[76] Inventors: Gary V. Seger, Rte. 1, Monte Vista, Colo. 81144; Wallace E. Fluhr, 1960 Alamosa Drive, Colorado Springs, Colo. 80907

[22] Filed: Aug. 12, 1974

[21] Appl. No.: 496,643

[52] U.S. Cl. .............................. 137/344; 285/114; 239/212
[51] Int. Cl.² ........................................ A01G 25/02
[58] Field of Search ............ 137/344, 615; 285/114, 285/115; 239/177, 212

[56] References Cited
UNITED STATES PATENTS

| | | | |
|---|---|---|---|
| 2,853,262 | 9/1958 | Reimann | 285/114 X |
| 3,406,907 | 10/1968 | Wallace | 239/212 X |
| 3,587,763 | 6/1971 | Kinkead | 137/344 X |
| 3,608,826 | 9/1971 | Reinke | 137/344 X |
| 3,623,663 | 11/1971 | Koinzan | 137/344 X |
| 3,750,953 | 8/1973 | Reinke | 137/344 X |

*Primary Examiner*—Henry T. Klinksiek
*Attorney, Agent, or Firm*—Richard W. Hanes

[57] ABSTRACT

A free standing swivel pipe connector for a center pivot irrigation system having a vertical water carrying conduit with pipe elbows attached to the upper and lower ends thereof. The upper portion of the pipe, including the upper elbow is rotatable around the longitudinal axis of the vertically standing conduit while the lower portion of the vertical pipe and lower elbow are fixed. The swivel joint between the fixed and rotatable pipe portions acts with an associated brace member which interconnects the said two portions of the pipe to provide an articulating joint for the vertical conduit premitting it a single degree of freedom in a plane coincident with the main distribution pipe of the irrigation system to which the upper elbow is attached. The articulating brace member, disposed bilaterally of the vertical pipe, is connected to the lower chord of the pipe truss in the irrigation system to reduce bending moments in the vertical swivel pipe.

4 Claims, 4 Drawing Figures

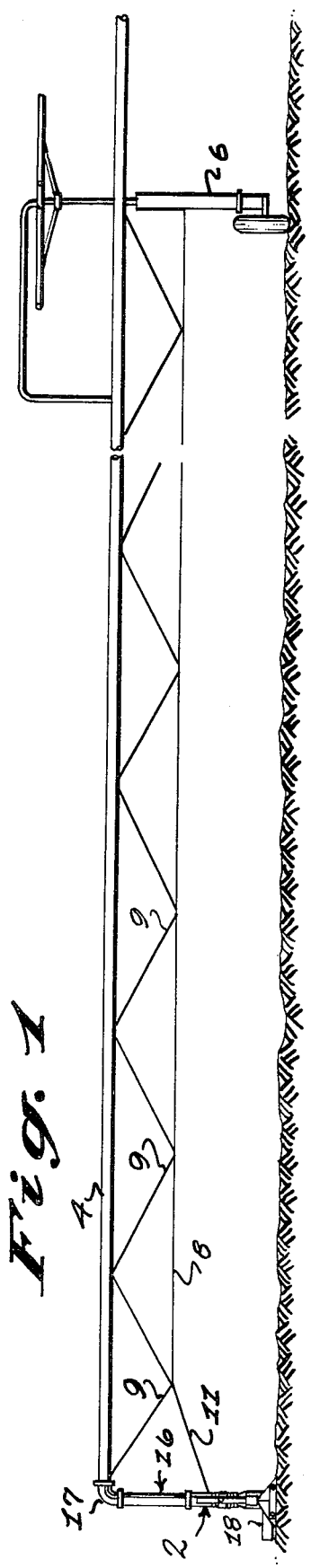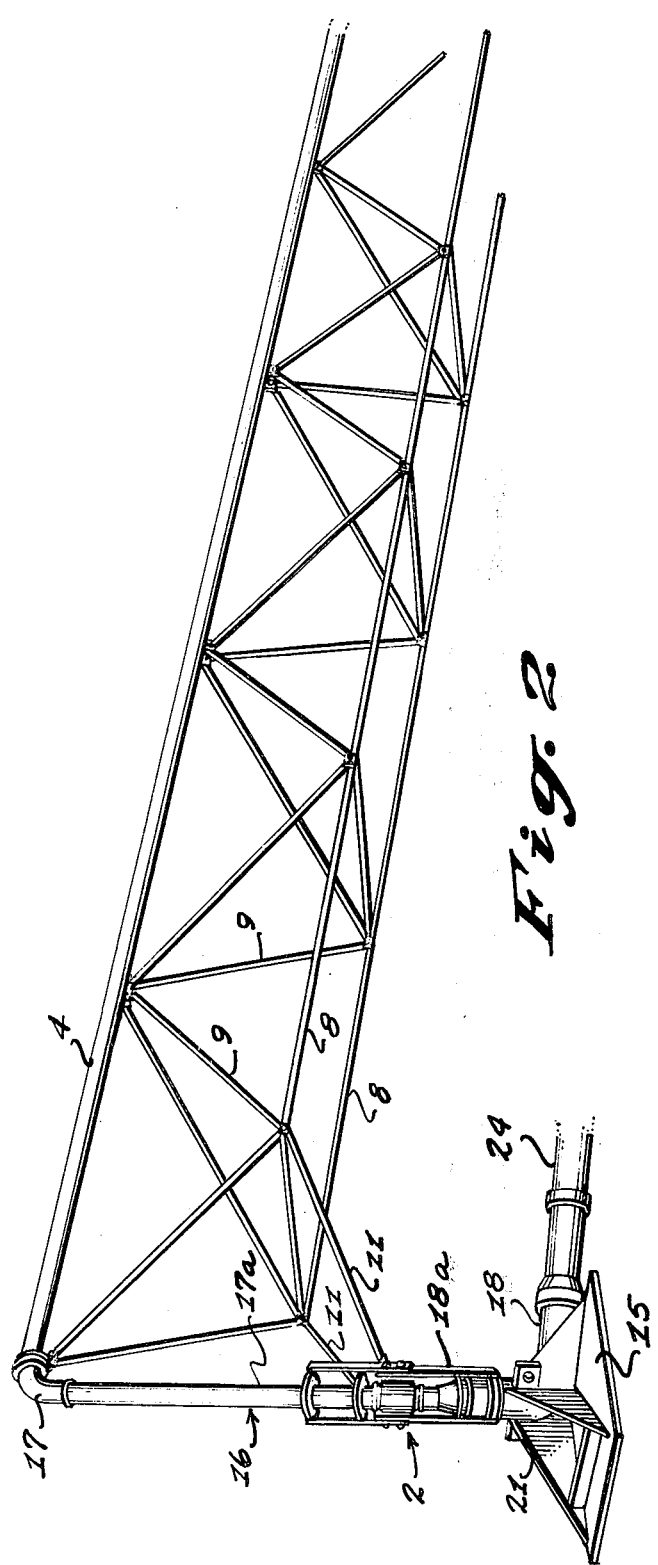

IRRIGATION SYSTEM PIVOT SWIVEL

BACKGROUND OF THE INVENTION

The invention relates to center pivot irrigation systems of the type wherein a long water distribution pipe is supported by a plurality of wheeled towers for rotation over the ground and around a central pivot point to which the main distribution pipe is attached and from which the irrigation water is supplied. More specifically, the invention concerns the construction of the pivot point swivel pipe assembly and the appropriate supports therefor.

Swivel pipe assemblies have, for the most part, consisted of a vertical or upright pipe section rotatably coupled to an upper elbow or "goose neck" which is attached to the main distribution pipe. The upright pipe was typically supported by a pyramidal steel structure, the apex of which was just below the upper elbow and the four corners of which were fastened to concrete piers buried in the ground. As the center pivot irrigation art advanced, system designs incorporated higher and higher structures for supporting the main distribution pipe which required higher and larger pyramidal pivot point supporting structures. Not only did these pivot structures require greater physical dimensions, they had to be constructed so as to resist greater bending moments because the lateral pull on the swivel pipe was being exerted at a greater distance from the ground.

SUMMARY OF THE INVENTION

The primary object of the present invention is to provide a free standing swivel pipe structure to serve as the pivot point for center pivot circular irrigation systems.

A further object of the invention is to provide a pivot point swivel pipe structure wherein a substantial portion of the lateral forces exerted on the vertical pipe member are transferred to a point relatively close to the ground to eliminate high bending moments in the vertical pipe.

Another object of the invention is to provide a swivel pipe structure which is hinged so as to provide a limited amount of movement of the vertical pipe around an axis parallel to the ground.

A still further object of the invention is to provide a free standing center pivot point swivel pipe structure wherein the size of the ground anchors can be minimized and external supporting structure reduced.

Other and further objects, features and advantages of the invention will be apparent upon a reading of the following detailed description of a preferred form of the invention taken in connection with the accompanying drawings in which:

FIG. 1 is a side elevational view of a portion of a center pivot irrigation system showing the center pivot support and the inboard tower.

FIG. 2 is a perspective view of the pivot point structure of the present invention shown coupled to the first span of main distribution pipe in a center pivot irrigation system.

DETAILED DESCRIPTION OF THE INVENTION

Figure 3:
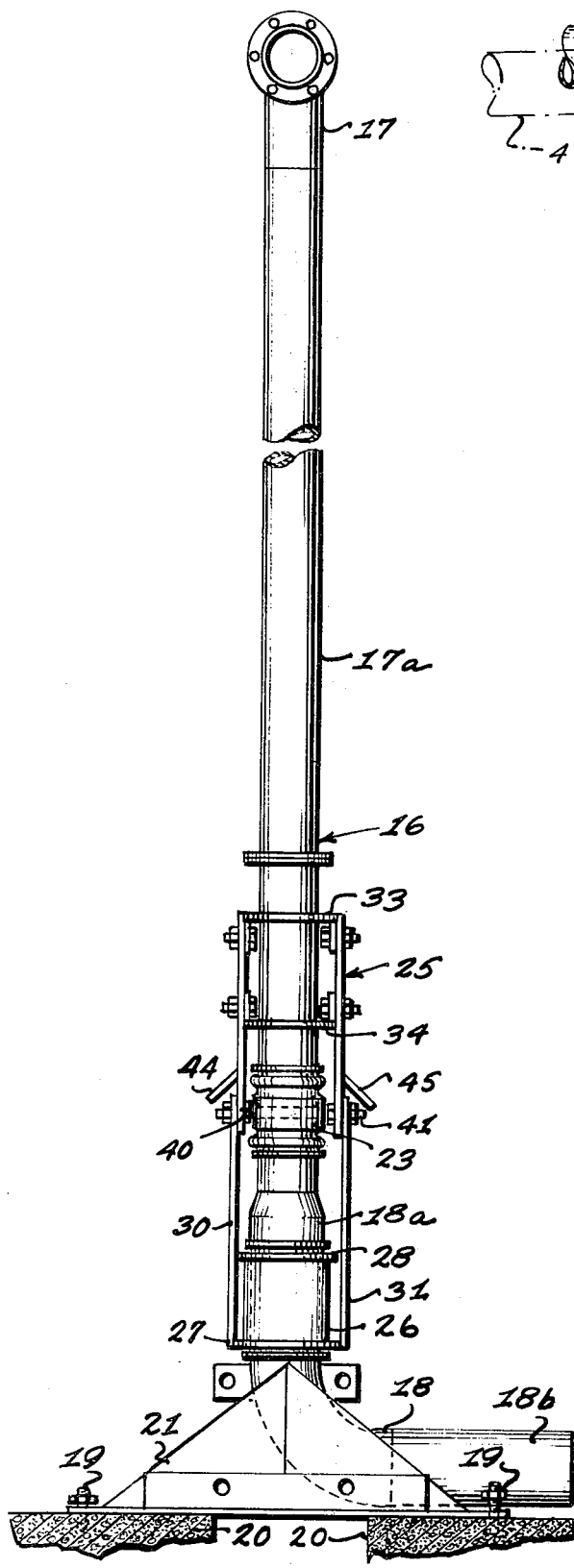
FIG. 3 is a front elevational view of the swivel pipe structure of the present invention showing a portion of the concrete piers broken away in cross section.

The swivel pipe pivot point structure 2 of the present invention is shown in FIG. 1 attached to a circular irrigation machine having an overhead main water distribution pipe 4 supported by a plurality of wheeled supports 6 (only one shown). The pivot point comprises basically a base member 15, a vertically upright water conduit 16, and upper and lower pipe elbows 17 and 18 attached to the vertical conduit. The lower elbow 18 is adapted to receive a coupling member which connects a main line irrigation pipe 24 for supplying water to the system. The upper elbow 17 is connected by a flange or other suitable means to the receiving end of the main distribution pipe 4.

Between the pivot point structure 2 and the first tower 6, the distribution pipe is supported and stiffened by a truss comprising a pair of parallel lower chords 8 and shear resisting diagonals 9 connected between the pipe 4 and the lower chords 8.

By virtue of the truss design, including the attachment of the lower truss chords 8 at the outside end of each pipe span to the supporting tower 6, many of the outwardly directed longitudinal forces occuring in the system during rotation are confined to the lower chords 8 instead of occuring in the pipe 4. The longitudinal force in the lower chords 8 is transferred to a low point on the pivot structure 2 by a pair of interconnecting tension members 11, the method and mode of connection being subsequently explained.

Figure 4:
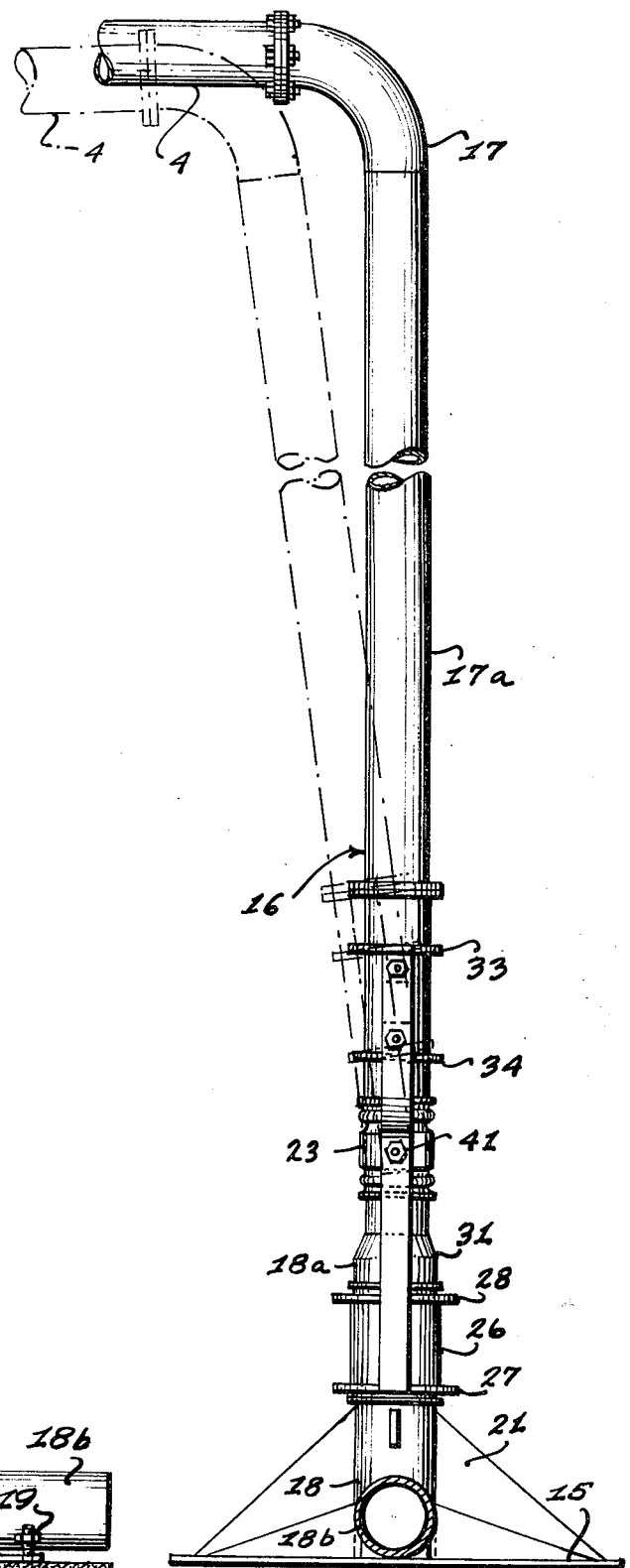
FIG. 4 is a side elevational view of the swivel pipe structure of the present invention showing a portion of the structure in phantom lines to illustrate the bending of the vertical conduit around a central hinge point.

The swivel pipe cnstruction is more clearly illustrated in FIGS. 3 and 4.

The base member 15 is preferably a flat steel plate with means at each corner to allow fasteners 19 to be inserted and imbedded in concrete piers 20. The base also includes appropriate webs, braces or fillets 21 to adequately position and firmly support the lower pipe elbow 18.

The ninety degree elbow 18 is provided with straight pipe extensions 18a and 18b at both of its ends, the later being necessary to accommodate a main line pipe coupler to connect the pivot structure to a source of water. The vertical extension 18a of the elbow 18 is swively interconnected to a depending straight extension 17a of the upper elbow 17 by a coupler 23. The coupler 23 is preferrably a tubular housing having means in both ends thereof to retain elastic O-rings. The ends of the straight pipes 18a and 17a are snugly positioned within the coupling housing and inside the O-rings to provide water-tight seals and relative rotation between the pipes 18a and 17a. The ends of the pipes are not abutted so that the elastic characteristics of the coupler O-rings can be utilized to give axial flexibility to the joint formed by the coupler.

In order that the upper elbow 17 and its lower extension 17a be adequately supported, a brace 25 is provided which derives its bearing and vertical stability from the upward extension 18a of the lower elbow 18 through a collar 26. The collar 26 comprises a section of rigid tubing rotatably disposed on the extension 18a. Flanges 27 and 28 are welded to the collar 26 to provide attachments for a pair of arms 30 and 31 which are disposed bilaterally of the vertical conduit 16 and which extend upwardly past the coupling 23. A pair of flanges 33 and 34 are welded to the lower pipe extension 17a and are bolted or otherwise securely fixed to the upper portion of the arms 33 and 34.

In operation, the upper elbow 17, its straight extension 17a, and the attached brace 25, can rotate with respect to pipe position 18a while the brace 25 is providing rigidity to the coupling 23 and vertical positioning to the upper portion of the swivel structure.

Total axial rigidity of the coupling 23 forming the swivel joint can be achieved by the brace 25, however, as mentioned earlier, it has been found desireable to allow some bending of the upright conduit 16 if the bending is confined to a plane coincident with the system's main distribution pipe. Allowing this single degree of freedom for the vertical conduit 16 is conducive to the accommodation of undulating terrain, especially close to the pivot point where the first support tower moves up and down with respect to the pivot point. The bending freedom in a single plane or about a single axis is achieved by providing a hinge or articulating joint 40 and 41 in each of the brace arms 30 and 31. The pivotal axes of the arm joints 40 and 41 are mutually common and preferrably pass through the center portion of the coupling 23 to obtain the greatest hinge flexibility.

Rigidly fixed to each arm 30 and 31 are ears 44 and 45 to which are attached the ends of the tension members 11 which tie to the lower chords 8 of the distribution pipe truss. The outward force derived from the circular travel of the irrigation machine around the field is almost completely absorbed by the lower truss chords and hence the tension members 11 resulting in a transference of these forces to a low level of the pivot structure. These forces, applied through the ears 44 and 45 and the arms 30 and 31, exert a pull on the brace 25 and effectively confine the pull force to a point below the ears. The relatively short distance above the ground at which the effective force is applied results in a substantially smaller bending moment on the vertical conduit 16 than in prior art devices where all of the outward forces were applied through the upper elbow, creating a large force moment. This feature of the invention permits the use of small space and cost saving bracing for the structure, such as the triangular fillet braces 21 which alone can support the entire pivot structure.

I claim:

1. A free standing swivel pipe connector for a center pivot irrigation system comprising:
   a first pipe elbow having at least one straight extension;
   a base member attached to said first pipe elbow;
   a second pipe elbow having at least one straight extension;
   liquid sealing flexible coupler means swively interconnecting the straight extensions of the first and second pipe elbows;
   a collar coaxial with and rotatably mounted on the straight extension of said first pipe elbow;
   a pair of support arms attached at their respective ends to the said collar and the extension of the second pipe elbow and disposed bilaterally of the said coupling means.

2. The combination of claim 1 wherein each of the support arms include hinge means intermediate the points of attachment to the collar and the said extension of the second elbow and wherein the pivotal axis of each hinge means is mutually aligned and passes through the coupling means.

3. The combination of claim 2 and further including attachment means integral with said support arms for attachment of an irrigation system truss member.

4. An articulated pipe joint comprising:
   first and second conduits spaced apart in axial alignment;
   at least one rigid support member disposed parallel to the longitudinal axis of said first and second conduits wherein the said support includes a hinge intermediate its ends and where the hinge axis is perpendicular to the longitudinal axis of said conduits and disposed within the plane of the separation between the conduits;
   flexible coupler means swively interconnecting the first and second conduits so that the first conduit may rotate about its longitudinal axis with respect to the second conduit;
   means rigidly interconnecting one end of the support member to the first conduit; and
   means attached to the other end of the support member to rotatingly engage the circumference of the second conduit.

* * * * *